(12) United States Patent
Killion

(10) Patent No.: US 10,505,640 B2
(45) Date of Patent: Dec. 10, 2019

(54) SLIDING BIAS METHOD AND SYSTEM FOR REDUCING IDLING CURRENT WHILE MAINTAINING MAXIMUM UNDISTORTED OUTPUT CAPABILITY IN A SINGLE-ENDED PULSE MODULATED DRIVER

(71) Applicant: ETYMOTIC RESEARCH, INC., Elk Grove Village, IL (US)

(72) Inventor: Mead C. Killion, Elk Grove Village, IL (US)

(73) Assignee: ETYMOTIC RESEARCH, INC., Elk Grove Village, IL (US)

( * ) Notice: Subject to any disclaimer, the term of this patent is extended or adjusted under 35 U.S.C. 154(b) by 765 days.

(21) Appl. No.: 14/732,291

(22) Filed: Jun. 5, 2015

(65) Prior Publication Data

US 2015/0358743 A1    Dec. 10, 2015

Related U.S. Application Data

(60) Provisional application No. 62/008,333, filed on Jun. 5, 2014.

(51) Int. Cl.
| | |
|---|---|
| *H04B 10/54* | (2013.01) |
| *H04L 27/04* | (2006.01) |
| *H04R 25/00* | (2006.01) |
| *H04L 25/06* | (2006.01) |
| *H04L 25/49* | (2006.01) |

(52) U.S. Cl.
CPC ........... *H04B 10/541* (2013.01); *H04L 25/06* (2013.01); *H04L 25/49* (2013.01); *H04L 27/04* (2013.01); *H04R 25/356* (2013.01); *H04R 2225/33* (2013.01); *H04R 2460/03* (2013.01)

(58) Field of Classification Search
CPC .................................................. H04R 2225/33
USPC ....................... 381/323, 28, 57, 84, 120, 161
See application file for complete search history.

(56) References Cited

U.S. PATENT DOCUMENTS

| | | | | |
|---|---|---|---|---|
| 2004/0189557 A1* | 9/2004 | Noro | .................. | G09G 3/32 |
| | | | | 345/82 |
| 2005/0018859 A1* | 1/2005 | Buchholz | ................ | H04R 1/083 |
| | | | | 381/74 |
| 2009/0128235 A1* | 5/2009 | Maenpaa | .................. | H03F 1/02 |
| | | | | 330/127 |
| 2010/0259328 A1* | 10/2010 | Giovannotto | ............. | H03F 3/26 |
| | | | | 330/195 |
| 2011/0140774 A1* | 6/2011 | Kaya | ..................... | H03F 3/2173 |
| | | | | 330/124 R |
| 2011/0254625 A1* | 10/2011 | Kohut | ................... | H03F 1/0222 |
| | | | | 330/251 |

* cited by examiner

*Primary Examiner* — Yosef K Laekemariam
(74) *Attorney, Agent, or Firm* — McAndrews, Held & Malloy, Ltd.

(57) ABSTRACT

Various embodiments include a system and method that control idling current of a pulse modulated driver. The system may include an audio input device configured to receive an audio input signal. The system can include sliding bias control circuitry configured to generate a sliding bias control signal based on a level of the audio input signal. The system may include sliding bias generation circuitry configured to generate a sliding bias voltage superimposed onto the audio input signal to generate a pulse modulated driver input signal that is input into an amplifier. The sliding bias voltage may be based on the sliding bias control signal.

20 Claims, 9 Drawing Sheets

SLIDING BIAS METHOD AND SYSTEM FOR REDUCING IDLING CURRENT WHILE MAINTAINING MAXIMUM UNDISTORTED OUTPUT CAPABILITY IN A SINGLE-ENDED PULSE MODULATED DRIVER

CROSS-REFERENCE TO RELATED APPLICATIONS/INCORPORATION BY REFERENCE

The present application claims priority under 35 U.S.C. § 119(e) to provisional application Ser. No. 62/008,333 filed on Jun. 5, 2014, entitled "Sliding Bias Method of Reducing Idling Current while Maintaining Maximum Undistorted Output Capability in a Single Ended Pulse Modulated Driver." The above referenced provisional application is hereby incorporated herein by reference in its entirety.

U.S. Pat. No. 4,592,087 issued to Killion on May 27, 1986, is incorporated by reference herein in its entirety.

U.S. Pat. No. 4,689,819 issued to Killion on Aug. 25, 1987, is incorporated by reference herein in its entirety.

U.S. Pat. No. 5,099,856 issued to Killion et al. on Mar. 31, 1992, is incorporated by reference herein in its entirety.

U.S. Pat. No. 5,131,046 issued to Killion et al. on Jul. 14, 1992, is incorporated by reference herein in its entirety.

U.S. Pat. No. 5,144,675 issued to Killion et al. on Sep. 1, 1992, is incorporated by reference herein in its entirety.

U.S. Pat. No. 6,466,678 issued to Killion et al. on Oct. 15, 2002, is incorporated by reference herein in its entirety.

U.S. Pat. No. 8,715,152 issued to Puria et al. on May 6, 2014, is incorporated by reference herein in its entirety.

U.S. Publication No. 2010/0048982 A1 by Puria et al, published on Feb. 25, 2010, is incorporated by reference herein in its entirety.

FIELD OF THE INVENTION

Certain embodiments of the invention relate to controlling idling current of a pulse modulated driver. More specifically, certain embodiments of the invention relate to a sliding bias method and system for reducing idling current while maintaining maximum undistorted output capability in a single-ended pulse modulated driver.

BACKGROUND OF THE INVENTION

Pulse duration modulation, often referred to as Class D modulation, is a scheme for increasing the efficiency of power amplifiers. Increasing the efficiency of power amplifiers is especially valuable in hearing aids, where the tiny cell must provide all the power for days, weeks, or months. An estimated 30-50 million hearing aids have incorporated the Class D hearing aid amplifier described by Killion in U.S. Pat. Nos. 4,592,087 and 4,689,819, which are incorporated by reference herein in their entirety, often more than doubling the battery life as a result. These Class D hearing aid amplifiers are generally characterized by a low-distortion push-pull balanced bridge output of pulse-duration-modulated pulses, and work extremely well with an inductive load that can store energy as described in the above patent disclosures and also described briefly in Killion 1991 [Audio, v75, No. 1, 42-44] and in further detail in Carlson 1988 [Hearing Instruments, v39, pp 30-32].

Killion, et al., in U.S. Pat. No. 5,099,856, which is incorporated by reference herein in its entirety, introduced a system for transmitting audio signals via light. The system includes a transmitter module, a fiber optic cable, and a receiver. The transmitter module converts an input signal into a Class D modulated series of light pulses. The fiber optic cable isolates the transmitter and receiver from common sources of electromagnetic interference. The receiver receives the light pulses and converts them into a replica of the original signal. The system has been implemented, for example, as an isolation amplifier for Auditory Brainstem Response measurements where interference is a constant problem. With this approach, however, the efficiency of a push-pull, balanced bridge output is lost. Instead, the light source, an LED, is driven directly with no intervening energy storage device.

A modulated light beam can also be used to transmit sufficient audio frequency current to a magnetic hearing aid receiver or "Earlens" vibrator on the eardrum of a wearer, as described in the U.S. Pat. No. 8,715,152 and U.S. Publication No. 2010/0048982 A1 by Puria et al, which are incorporated by reference herein in their entirety. In one example of such an application, a modulated stream of pulses may produce an average LED current of 10 mA, with peak current of 20 mA. Although a Class A driver works in this application, the LED light output versus current generally shows a non-linear characteristic, with less efficiency at lower currents, creating a distortion in the demodulated signal. For this reason, some form of pulse modulation, such as Class D pulse duration modulation, can provide greater linearity between the averaged light output and the input signal because each pulse—long or short—is at maximum light-output efficiency. If Class D peaks are set to 20 mA, then 100% ON time corresponds to a continuous current of 20 mA, 0% ON time produces zero current, and 50% ON time corresponds to an average current of 10 mA. This often is the zero-signal condition. In this way, the equivalent of a Class A waveform replication of the amplified input signal is obtained after the received light pulses sensed with a photodetector diode or transistor are averaged to produce an audio signal.

Another problem with Class A power amplifiers is a relatively large battery drain. Specifically, the idling current at zero signal is one half of the peak current, allowing a maximum sine wave waveform to go from the idling current to twice the idling current on one half of the peak waveform and from the idling current to zero current on the other half. Changing to pulse duration modulation does not improve the situation in the case of a resistive or LED load. In the above LED example, the same average current drain of about 10 mA is needed in either case. By using a voltage doubler, 10 mA at 2.2 V calls for approximately 20 mA from a 1.3 V Zinc Air cell, or a total of 26 mW. Ignoring other power consumption, this would correspond to only 23 hours life on the most powerful 675 Cochlear Zinc Air hearing aid cell. In other words, a new battery is needed at the start of each day with either Class A or Class D output.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for controlling idling current of a pulse modulated driver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
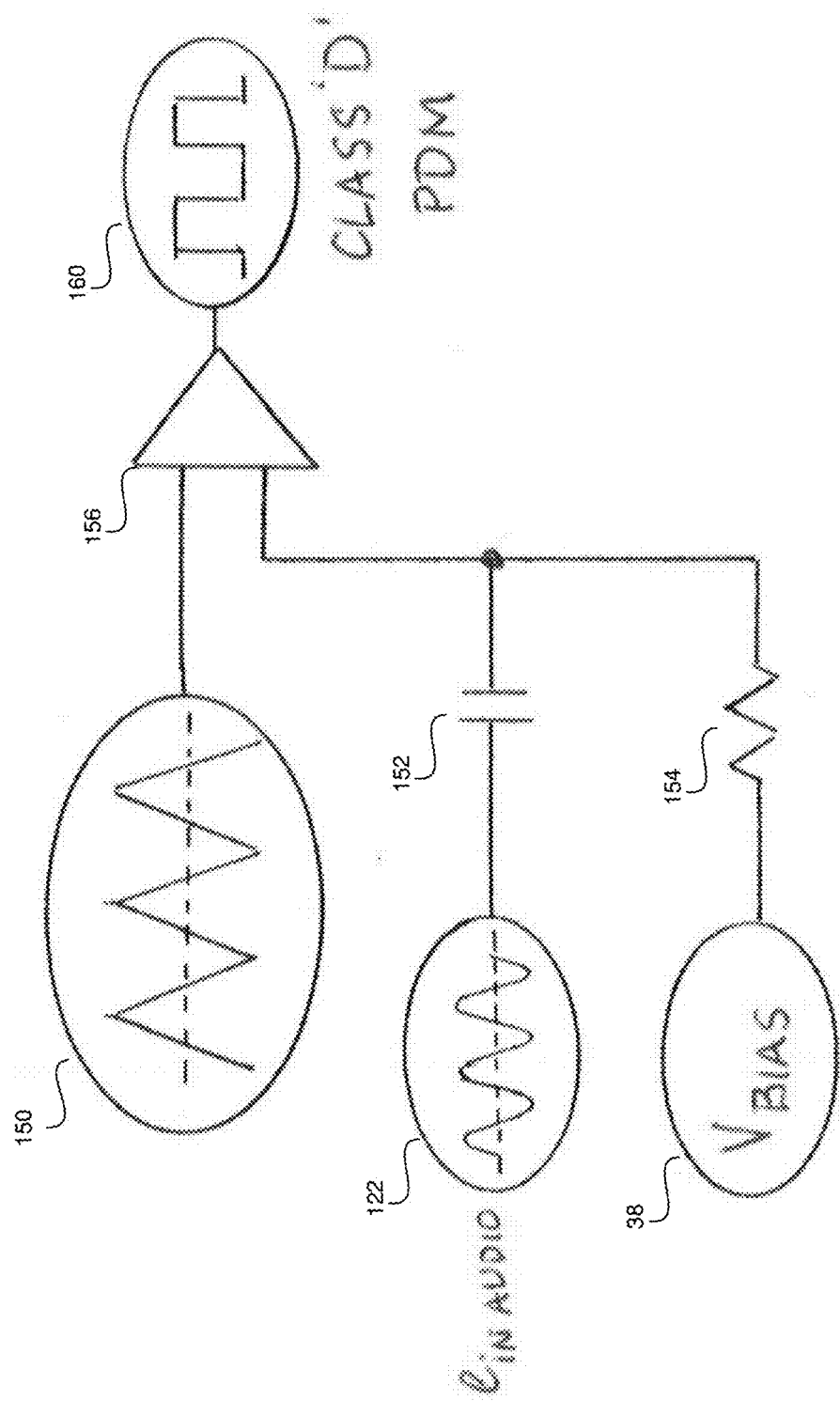
FIG. 1 is a block diagram of an exemplary pulse modulated driver for controlling idling current, in accordance with an embodiment of the invention.

Certain embodiments of the invention may be found in a method 200 and system 100 for controlling idling current of a pulse modulated driver by regulating a sliding bias voltage 38. For example, aspects of the present invention have the technical effect of increasing the efficiency of a Class D modulator 160 by superimposing a sliding bias voltage 38 onto the audio input signal 122 so that at low audio input signal levels a low percentage ON time (and thus low idling current) results, whereas when a large audio input signal is presented, the sliding bias 38 can quickly rise towards 50% ON time of the pulse train, maintaining low audible distortion under all conditions.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments of the present invention. The following detailed description is, therefore, not to be taken in a limiting sense, and the scope of the present invention is defined by the appended claims and their equivalents.

As used herein, an element or step recited in the singular and proceeded with the word "a" or "an" should be understood as not excluding plural of said elements or steps, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Furthermore, the term processor or processing unit, as used herein, refers to any type of processing unit that can carry out the required calculations needed for the invention, such as single or multi-core: CPU, DSP, FPGA, ASIC, ARM processor, or a combination thereof.

FIG. 1 is a block diagram of an exemplary pulse modulated driver for controlling idling current, in accordance with an embodiment of the invention. Referring to FIG. 1, there is shown inputs of a single-ended Class D amplifier 160, comprising a saw tooth waveform 150, an audio signal 122, and a sliding bias input ($V_{BIAS}$) 38. In an exemplary embodiment, the saw tooth waveform 150 is applied to one side of the differential comparator 156 and an audio signal 122 is applied to the other side of the differential comparator 156. The audio signal 122 can be decoupled by a capacitor 152. A sliding bias input ($V_{BIAS}$) voltage 38 is added to the audio input signal 122 to control the idle percentage ON time of the Class D amplifier 160. While a differential input is shown for the modulator, a single ended input may be alternatively implemented, with the saw tooth 150, the audio signal 122, and a bias signal 38 combined at a single input, provided only that the peak-to-peak saw tooth waveform 150 exceeds the peak-to-peak AC signal input 122. The sliding bias 38 may provide a relatively low value of idle current without affecting the small-signal output of the modulator since the audio signal 122 is capacitor 152 decoupled. The value of $V_{BIAS}$ 38 corresponding to the switched output waveform of FIG. 1 has been chosen for a 50-50 on-off time, where ON is full supply voltage and OFF is 0 volts, for example.

Figure 2:
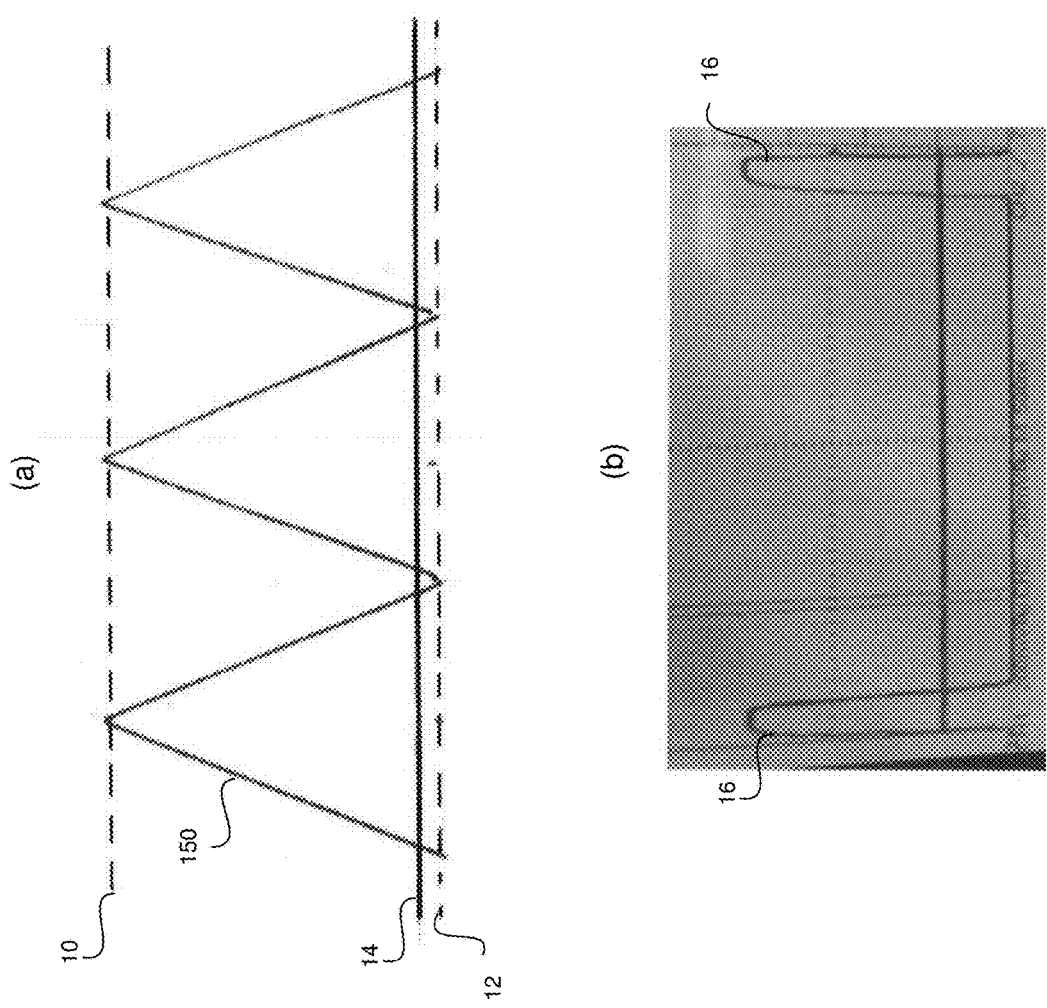
FIG. 2 illustrates corresponding waveforms with the sliding bias set for a low value of ON time in the output pulses, in accordance with an embodiment of the invention.

FIG. 2 illustrates corresponding waveforms (a), (b) with the sliding bias set for a low value 14 of ON time in the output pulses 16, in accordance with an embodiment of the invention. Referring to FIG. 2, there is shown (a) a saw tooth waveform 150 having a maximum peak current 10, a zero current 12, and a 5% of maximum peak current idle current 14. Also shown is (b) a pulse modulated waveform with 5% ON time pulses 16. With a dissipative load such as a light emitting diode (LED), a 5% ON time corresponds to one tenth the average current delivered with a 50% ON time, the latter also referred to as a 50-50 duty cycle.

In an exemplary embodiment, the peak current 10 of an LED may be 20 mA, so the average current delivered with 50% ON time is 10 mA. In contrast, the average current delivered with a 5% ON time is 1 mA. In daily practice, the 5% ON time idle is used the majority of the time. For example, if the 50% condition allows 110 dB output, the 5% condition would allow 90 dB undistorted signal output. In typical hearing aid applications, the gain for loud sounds is typically reduced to zero for sounds in the 90-110 dB region because these sounds are loud enough, and sometimes too loud, for both normal hearing and hearing-impaired individuals, and adding gain could be uncomfortable for a wearer of the hearing aid.

Figure 3:
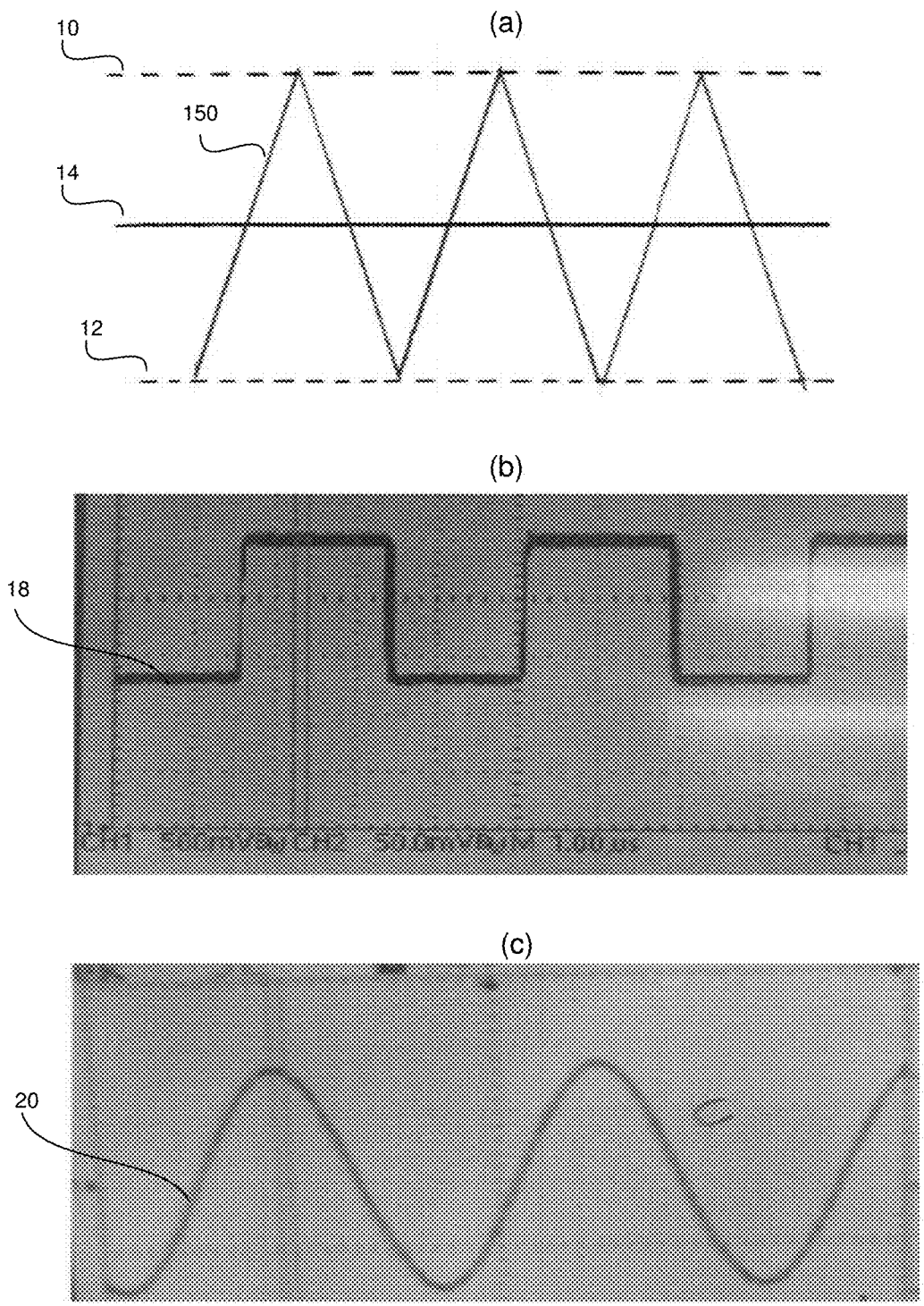
FIG. 3 illustrates corresponding waveforms with the sliding bias set for 50% ON time, in accordance with an embodiment of the invention.

FIG. 3 illustrates corresponding waveforms (a), (b), (c) with the sliding bias 14 set for 50% ON time, in accordance with an embodiment of the invention. Referring to FIG. 3, there is shown (a) a saw tooth waveform 150 having a maximum peak current 10, a zero current 12, and a 50% of maximum peak current 14. Also shown are (b) square wave output pulses 18 with no signal input, showing 50% ON time. Still referring to FIG. 3, there is shown (c) a waveform illustrating a maximum undistorted demodulated signal output 20 for a 1 kHz sine wave input just before clipping sets in. In various embodiments, the sliding bias voltage 38 is set low when the input signal 122 is low so the output pulse ON time is, for example, 5% or less the majority of the time. The $V_{BIAS}$ is ramped up to 50%, as shown in FIG. 3, so the idling current is 50% of the peak current when the input signal 122 exceeds a selected level, such as a sound pressure level or other suitable criteria. For example, if the peak current is 20 mA, the average idling current is 10 mA for 50% ON time. The average idling current for 5% ON time is 1 mA, a 10 to 1 reduction in idling battery drain.

Figure 4:
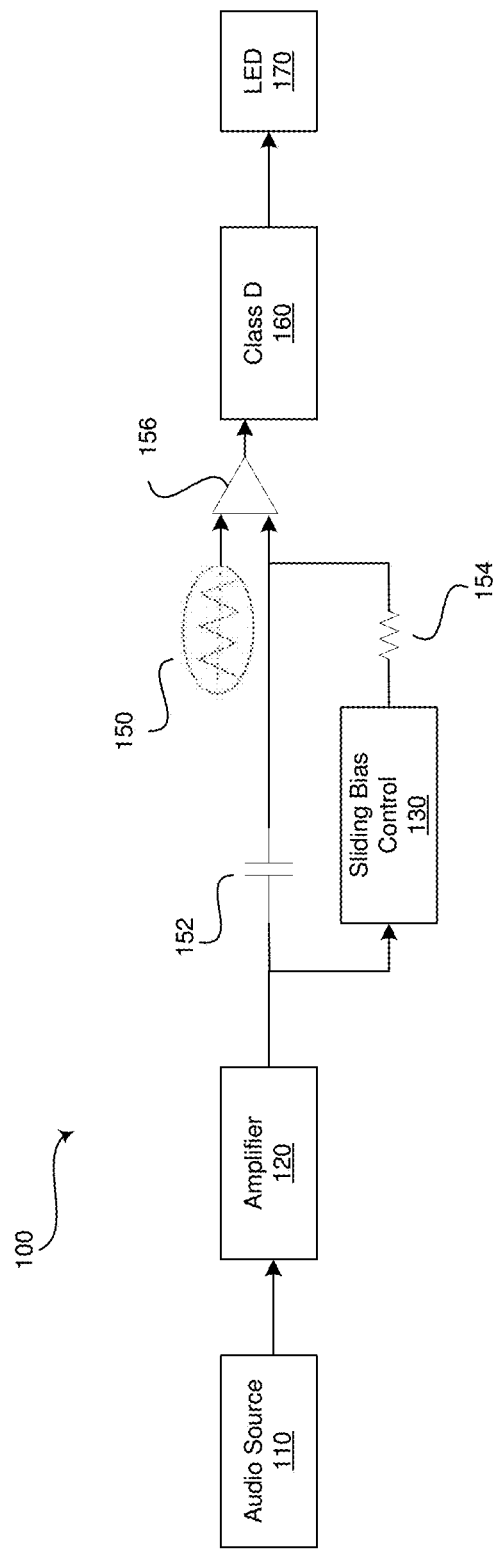
FIG. 4 is a block diagram of an exemplary system for controlling idling current of a pulse modulated driver, in accordance with an embodiment of the invention.

FIG. 4 is a block diagram of an exemplary system 100 for controlling idling current of a pulse modulated driver, in accordance with an embodiment of the invention. Referring to FIG. 4, the system 100 comprises an audio source 110, a front end amplifier 120, sliding bias control 130, a saw tooth waveform generator 150, a Class D amplifier 160, and a light emitting diode (LED) 170. The audio source 110 can be a microphone, a direct audio input such as from a media player, a telecoil, or any suitable input mechanism for receiving sound and/or an audio signal. The audio input signal 122, or sound converted into an audio input signal 122, is provided to the front end amplifier 120.

In various embodiments, the front end amplifier 120 may comprise suitable logic, circuitry, interfaces and/or code that may be operable to amplify the audio input signal 122. For example, the front end amplifier 120 may provide alternating current (AC) amplification of the audio input signal 122. As another example, the front end amplifier 120 can provide direct current (DC) level shift and offset adjust to the audio input signal 122. In an exemplary embodiment, the front end amplifier 120 may be a "K-AMP" as described in U.S. Pat. No. 5,131,046, by Killion, et al., which is incorporated by reference herein in its entirety. In certain embodiments, the front end amplifier 120 can be a digital signal processor that executes an algorithm, code, and/or instructions, for example, to provide the appropriate amplification. For example, the digital signal processor may be a "DigiK" processor as disclosed in U.S. Pat. No. 6,466,678, by Killion et al., which is incorporated by reference herein in its entirety, and also described in the DigiK Manufacturing Software and Fitting Software manual published by Etymotic Research, Inc. in September 2002. Still referring to FIG. 4, the AC amplified and DC shifted audio input signal 122 may be provided to the sliding bias control 130, which can be implemented in analog or digital.

Figure 5:
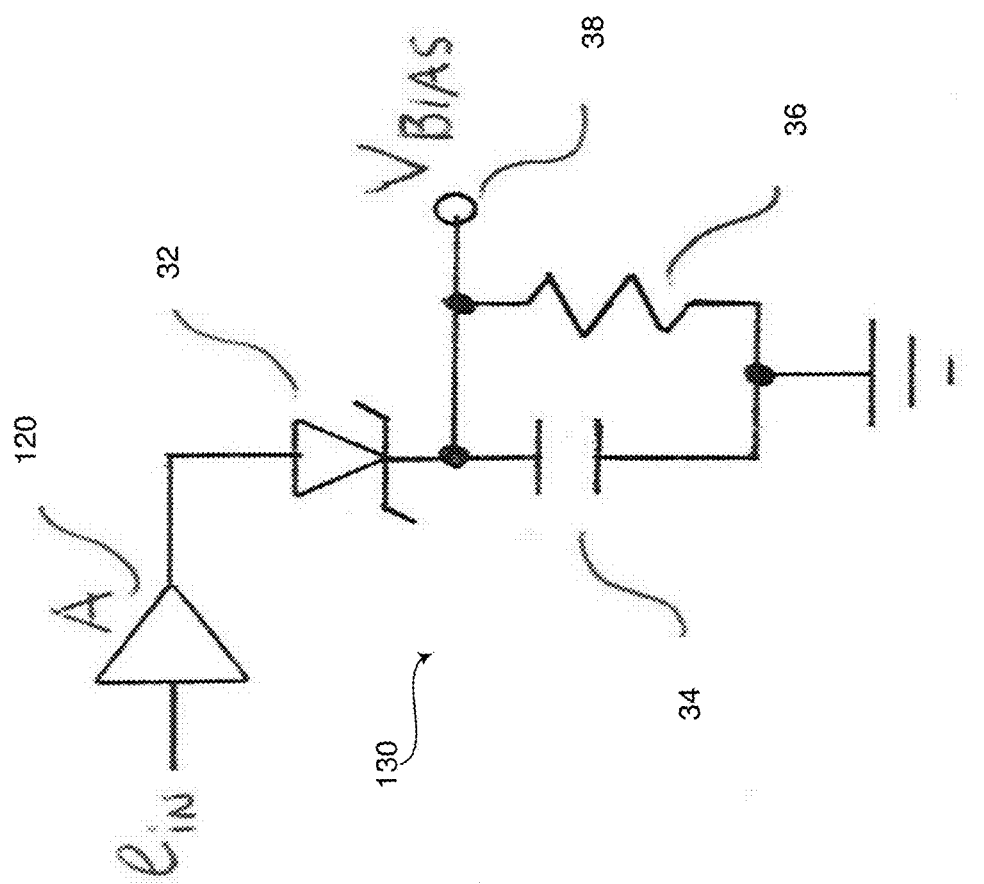
FIG. 5 is a diagram of exemplary circuitry of the sliding bias control illustrated in FIG. 4 configured to dynamically change a bias voltage, in accordance with an embodiment of the invention.

In various embodiments, the sliding bias control 130 may comprise suitable logic, circuitry, interfaces and/or code that may be operable to generate a sliding bias control signal that is used to generate a sliding bias voltage. FIG. 5 is a diagram of exemplary analog circuitry of the sliding bias control 130 illustrated in FIG. 4 configured to dynamically change a bias voltage, in accordance with an embodiment of the invention. Referring to FIG. 5, an audio input signal 122 may be AC amplified and DC shifted by front end amplifier 120 as discussed above. The bias control signal can be generated, for example, by a rectifier 32, with capacitor 34 and resistor 36 determining the recovery time constant. In certain embodiments, rectifier 32, which may be a Shockley diode, for example, is engaged and the capacitor 34 is quickly brought up to a voltage on bias output 38 corresponding to 50% idling current if a sudden large audio input signal 122 is received. The bias voltage $V_{BIAS}$ 38 drifts back down following the R-C time constant determined by capacitor 34 and resistor 36 to the lower idling current, such as 5%, if the loud audio input signal 122 is reduced.

Referring again to FIG. 4, the sliding bias control 130 may additionally and/or alternatively be implemented as a digital signal processor that executes an algorithm, code, and/or instructions, for example, to provide a control signal that increases or decreases the bias 38 proportional to the level, or other suitable characteristic, of the audio input signal 122. The bias 38 is increased to provide an undistorted output signal corresponding with the audio input signal 122. With a digital implementation of the sliding bias control 130, the application of the audio input signal 122 may be delayed to provide a gradual and therefore less audible increase in the bias 38. The delay may be approximately 10 ms, which is defined as between 5 and 30 ms, such that a delay in the audio input signal 122 may not be noticeable to a listener.

In certain embodiments, the sliding bias control 130 can additionally and/or alternatively be derived from the adaptive compression circuit of the K-AMP 120 described in U.S. Pat. No. 5,144,675 by Killion et al., which is incorporated by reference herein in its entirety. In such an embodiment, the sliding bias voltage 38 recovers slowly to the low-idle state after a prolonged loud sound, to avoid "pumping," but recovers quickly for a short loud sound, to avoid "off the air" sounds. As described below with respect to FIGS. 6 and 7, the sliding bias control signal may be provided from the compression ratio control output of the K-AMP 120.

Referring to FIG. 4, the sliding bias control 130 outputs a generated sliding bias voltage 38 that is added to the audio input signal 122 to control the idle percentage ON time of the modulator. A saw tooth waveform generator provides a saw tooth waveform 150 to one side of a differential comparator 156 and the sliding bias voltage 38 superimposed onto the audio input signal 122 is provided at the other side of the differential comparator 156. The output of the comparator 156 is provided to the amplifier 160, such as a single-ended Class D amplifier, for example. Alternatively, the saw tooth waveform 150, audio signal 122, and bias signal 38 may be combined at a single input and provided to the amplifier 160.

In various embodiments, the amplifier 160 may comprise suitable logic, circuitry, interfaces and/or code that may be operable to generate a pulse modulated output signal that drives a light emitting diode (LED) 170. In various embodiments, the LED 170 may comprise suitable logic, circuitry, interfaces and/or code that may be operable to generate a modulated light beam to transmit the audio signals, for example. Certain embodiments provide a voltage doubling circuit between the amplifier 160 and the LED 170. For example, if the LED 170 calls for 2 Volts or more and a 1.25 Volt cell voltage is desired, a voltage doubler circuit, such as described in U.S. Pat. No. 5,099,856 by Killion et al., which is incorporated by reference herein in its entirety, may be implemented to provide nearly constant drive voltage to LED 170.

In various embodiments, the sliding bias single-ended Class D implementation can be obtained in software with any pulse-modulation scheme incorporated in a digital hearing aid circuit. For example, instructions, code, and/or algorithms may be provided that dynamically shifts the pulse modulation to increase the idling current so the maximum signal capability is correspondingly increased if a calculated level of the audio input signal 122 exceeds a threshold set for the low idling current. Furthermore, the recovery time and attack time constants can be determined by clock counting rather than from physical resistor-capacitor(s) time constants. Accordingly, the sound quality of the digital hearing aid can be substantially indistinguishable from the analog version of the sliding bias control circuitry as shown by the fidelity ratings of the K-AMP and DigiK illustrated in FIG. 4 of Killion, "Myths that Discourage Improvements in Hearing Aid Design," Hearing Review, Volume 11, p. 38, January 2004.

The exemplary system 100 for controlling idling current of a pulse modulated driver of FIG. 4 shares various characteristics with the exemplary pulse modulated driver for controlling idling current illustrated in FIG. 1 and described above.

Figure 6:
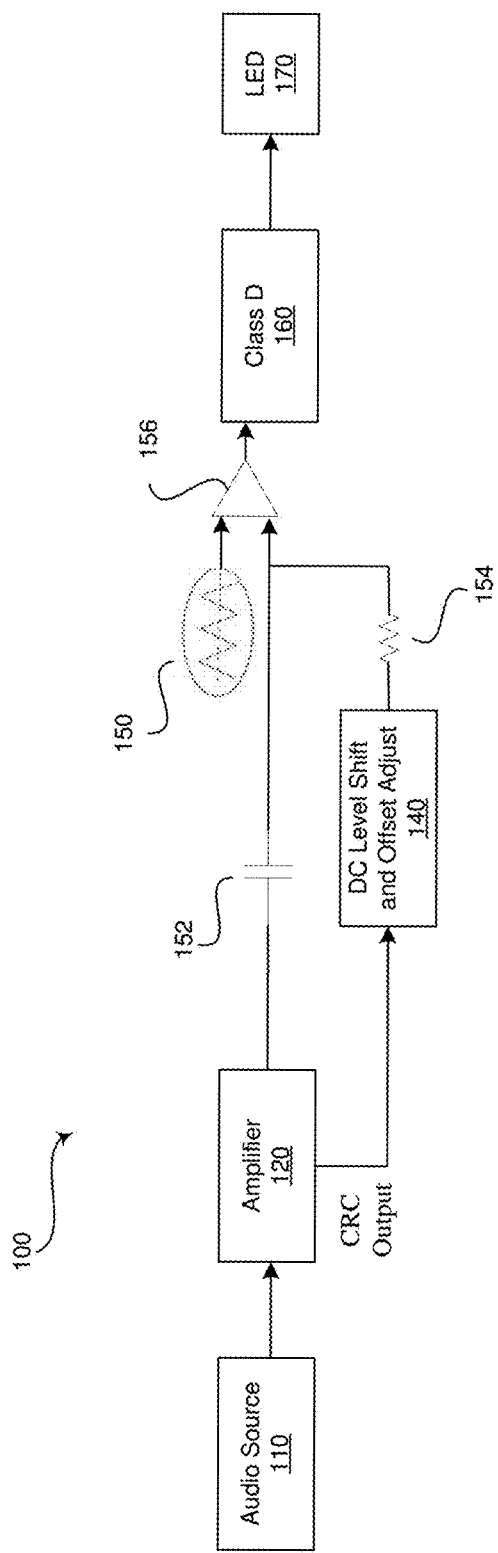
FIG. 6 is a block diagram of an exemplary system for controlling idling current of a pulse modulated driver, in accordance with an embodiment of the invention.

FIG. 6 is a block diagram of an exemplary system 100 for controlling idling current of a pulse modulated driver, in accordance with an embodiment of the invention. Referring to FIG. 6, the system 100 comprises an audio source 110, a front end amplifier 120, DC level shift and offset adjust 140, a saw tooth waveform generator 150, a Class D amplifier 160, and a light emitting diode (LED) 170. The audio source 110, also referred to as an audio input device, can be a microphone, a direct audio input such as from a media player, a telecoil, or any suitable input mechanism for receiving sound and/or an audio signal. The audio input signal 122, or sound converted into an audio input signal 122, is provided to a front end amplifier 120.

In various embodiments, the front end amplifier 120 may comprise suitable logic, circuitry, interfaces and/or code that may be operable to amplify the audio input signal 122. For example, the front end amplifier 120 may provide alternating current (AC) amplification of the audio input signal 122. In certain embodiments, the front end amplifier 120 can be a digital signal processor that executes an algorithm, code, and/or instructions, for example, to provide the appropriate amplification. Additionally and/or alternatively, the front end amplifier 120 may be a "K-AMP" as described in U.S. Pat. No. 5,131,046, by Killion, et al., which is incorporated by reference herein in its entirety. The K-AMP amplifier 120 includes a variable recovery time circuit for use with wide dynamic range automatic gain control, commonly known as "adaptive compression." The DC voltage available from the compression ratio control (CRC) output on the K-AMP circuit 120 can provide the appropriate time constant for a sliding bias control of the idling current of the Class D amplifier 160 via the DC level shift and offset adjust 140. Similarly, the appropriate time constant for the sliding bias control can be obtained by a digital processor, such as the DigiK referred to above.

In various embodiments, the DC level shift and offset adjust 140 may comprise suitable logic, circuitry, interfaces and/or code that may be operable to provide direct current (DC) level shift and offset adjust to the output of the front end amplifier 120, such as the compression ratio control (CRC) output on the K-AMP circuit 120. In certain embodiments, the DC level shift and offset adjust 140 can be a digital signal processor that executes an algorithm, code, and/or instructions, for example, to provide the appropriate level shift and offset. Additionally and/or alternatively, the DC level shift and offset adjust 140 may be circuitry, for example, as illustrated in FIG. 7.

Figure 7:
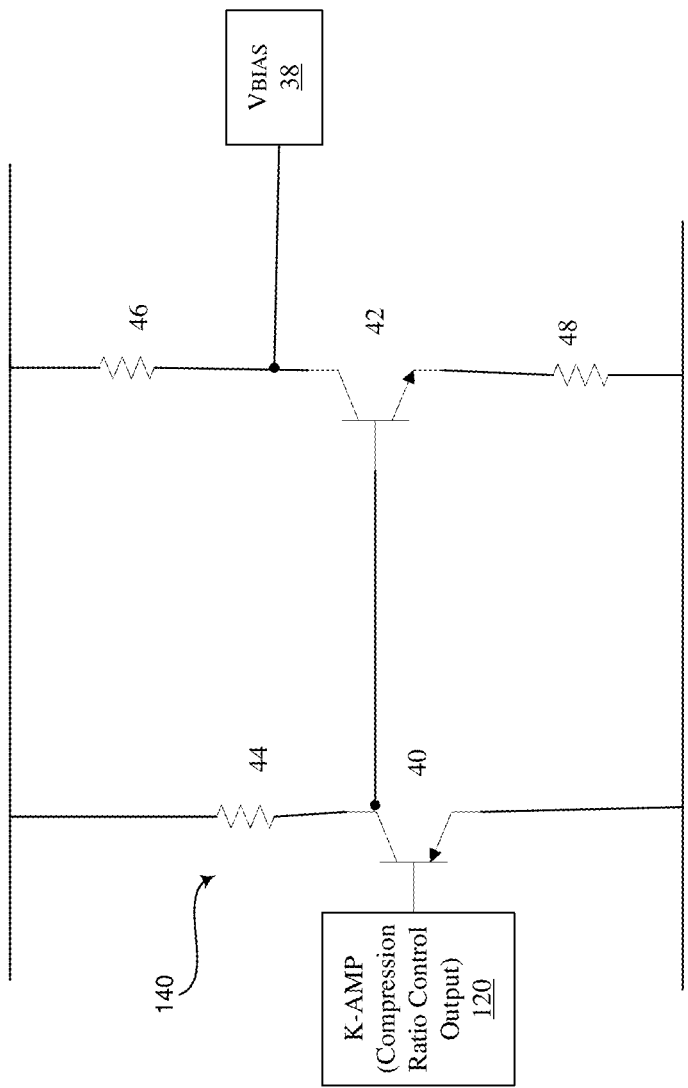
FIG. 7 is a diagram of exemplary circuitry of the direct current (DC) level shift and offset adjust illustrated in FIG. 6, in accordance with an embodiment of the invention.

FIG. 7 is a diagram of exemplary circuitry of the direct current (DC) level shift and offset adjust 140 illustrated in FIG. 6, in accordance with an embodiment of the invention. Referring to FIG. 7, the DC level shift and offset adjust 140 comprises transistors 40, 42 and resistors 44, 46, 48 that provide the DC level shift and offset to generate the sliding bias voltage ($V_{BIAS}$) 38. For example, the voltage from the compression ratio control (CRC) output of K-AMP 120 may be approximately zero volts for audio input signals 122 of 90 dB SPL and greater, and approximately 0.3 Volts for quiet audio input signals 122 of 40-60 dB SPL.

In various embodiments, resistor 46 may be selected so that with no current flowing in transistor 42, the idling ON time will be about 50% (e.g., 0.45 Volts in FIG. 8), the normal operating condition for full signal hearing aid applications. The voltage at the emitter of NPN transistor 42 is approximately equal to the voltage at the compression ratio control (CRC) output on the K-AMP circuit 120 that is applied to the base of PNP transistor 40, provided that both come from a compatible integrated circuit process and have appropriate emitter areas, since both have similar operating current. Accordingly, for loud signals of 90 dB SPL and above, for example, the current in transistor 42 is zero and does not interfere with the 50% ON time set by resistor 46.

Figure 8:
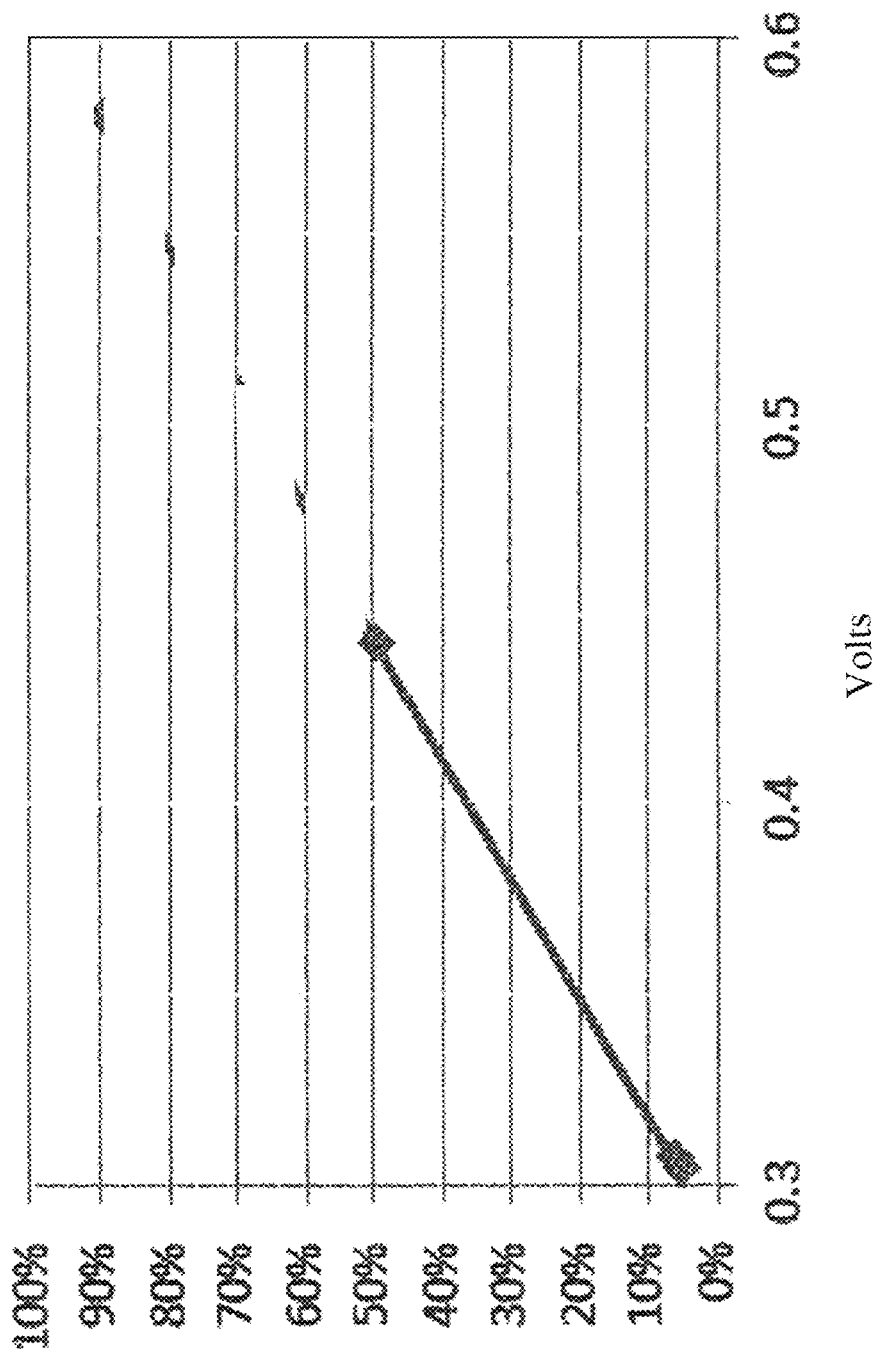
FIG. 8 is a graph illustrating an exemplary change in bias voltage at a percentage of ON time of a Class D modulator, in accordance with an embodiment of the invention.

In certain embodiments, resistor 48 can be selected so that for quiet signals the current in transistor 42 can pull the bias voltage 38 to about 0.3 V as shown in FIG. 8, so the percentage ON time of the output pulses is about 5% to 10%. The sliding bias control voltage 38 may be introduced without affecting the normal signal flow to the Class D amplifier 160 by applying a constant-current source from transistor 42. In this way, the adaptive compression circuitry of the K-AMP front end amplifier 120 can provide appropriate time constants for the sliding bias control voltage 38 and provide the wide-dynamic-range-compression operation of the K-AMP front end amplifier 120.

Referring again to FIG. 6, the DC level shift and offset adjust 140 outputs a generated sliding bias voltage 38 that is added to the audio input signal 122 to control the idle percentage ON time of the modulator. A saw tooth waveform generator provides a saw tooth waveform 150 to one side of a differential comparator 156 and the sliding bias voltage 38 superimposed onto the audio input signal 122 is provided at the other side of the differential comparator 156. The output of the comparator 156 is provided to the amplifier 160, such as a single-ended Class D amplifier, for example. Alternatively, the saw tooth waveform 150, audio signal 122, and bias signal 38 may be combined at a single input and provided to the amplifier 160.

In various embodiments, the amplifier 160 may comprise suitable logic, circuitry, interfaces and/or code that may be operable to generate a pulse modulated output signal that drives a light emitting diode (LED) 170. In various embodiments, the LED 170 may comprise suitable logic, circuitry, interfaces and/or code that may be operable to generate a modulated light beam to transmit the audio signals, for example. Certain embodiments provide a voltage doubling circuit between the amplifier 160 and the LED 170 that provide nearly constant drive voltage to LED 170.

The exemplary system 100 for controlling idling current of a pulse modulated driver of FIG. 6 shares various characteristics with the exemplary system 100 for controlling idling current of a pulse modulated driver illustrated in FIGS. 1 and 4 as described above.

FIG. 8 is a graph illustrating an exemplary change in bias voltage at a percentage of ON time of a Class D modulator, in accordance with an embodiment of the invention. Referring to FIG. 8, a bias 38 of 0.3 Volts corresponds to 5% ON time, while 0.45 Volts bias 38 produces the 50% ON time corresponding to loud audio input signals 122.

Figure 9:
FIG. 9 is a flow chart illustrating exemplary steps that may be utilized for controlling idling current of a pulse modulated driver, in accordance with an embodiment of the invention.

FIG. 9 is a flow chart 200 illustrating exemplary steps 202-216 that may be utilized for controlling idling current of a pulse modulated driver, in accordance with an embodiment of the invention. Referring to FIG. 9, there is shown a flow chart 200 comprising exemplary steps 202 through 216. Certain embodiments of the present invention may omit one or more of the steps, and/or perform the steps in a different order than the order listed, and/or combine certain of the steps discussed below. For example, some steps may not be performed in certain embodiments of the present invention. As a further example, certain steps may be performed in a different temporal order, including simultaneously, than listed below.

In step 202, an audio input signal 122 is received. For example, the audio input signal 122 may be received at an audio input device 110, such as a microphone, telecoil, direct audio input, or any suitable mechanism for receiving an audio input signal 122.

In step 204, the audio input signal 122 is amplified. For example, the audio input signal 122 may be provided to a front end amplifier 120. The front end amplifier 120 may provide alternating current (AC) amplification of the audio input signal 122. The front end amplifier 120 can also provide direct current (DC) level shift and offset adjust to the audio input signal 122. The front end amplifier 120 may include logic, circuitry, interfaces, and/or code. For example, the front end amplifier 120 can be a digital signal processor, a "K-AMP" as described in U.S. Pat. No. 5,131,046, by Killion, et al., which is incorporated by reference herein in its entirety, or any suitable circuitry.

In step 206, a level of the audio input signal 122 is measured. For example, the AC amplified and DC shifted audio input signal 122 may be provided to a sliding bias control 130. The sliding bias control 130 may comprise suitable logic, circuitry, interfaces and/or code that may be operable to measure a level of the audio input signal 122. For example, a rectifier 32 may be engaged in response a sudden large audio input signal 122 being received that exceeds a threshold. As another example, a digital signal processor may execute an algorithm, code, and/or instructions to measure the level, such as the sound pressure level or other suitable characteristic, of the audio input signal 122.

In step 208, a sliding bias control signal is generated based on the measured level of the audio input signal 122. For example, a sliding bias control 130 may comprise suitable logic, circuitry, interfaces and/or code that may be operable to generate a sliding bias control signal that is used to generate a sliding bias voltage 38 based on a measured level or other suitable characteristic of the audio input signal 122. The bias control signal can be generated by a rectifier 32, where the rectifier becomes engaged in response a sudden large audio input signal 122 being received that exceeds a threshold. As another example, the sliding bias control 130 may be implemented as a digital signal processor that executes an algorithm, code, and/or instructions to provide the bias control signal that increases or decreases the bias 38 proportional to the level, such as the sound pressure level or other suitable characteristic, of the audio input signal 122. As a further example, the sliding bias control signal can be derived from the adaptive compression circuit of the K-AMP 120 described in U.S. Pat. No. 5,144,675 by Killion et al., which is incorporated by reference herein in its entirety. Specifically, the sliding bias control signal may be provided from the compression ratio control output of the K-AMP 120.

In step 210, a sliding bias voltage is generated based on the sliding bias control signal. For example, the sliding bias control 130 may comprise suitable logic, circuitry, interfaces and/or code that may be operable to generate a sliding bias voltage 38 based on the sliding bias control signal. The capacitor 34 of sliding bias control circuitry 130 may be quickly increased to a voltage on bias output 38 corresponding to 50% idling current if, for example, rectifier 32 is engaged in response a large audio input signal 122 being received. The bias voltage $V_{BIAS}$ 38 can be decreased following the R-C time constant determined by capacitor 34 and resistor 36 to the lower idling current, such as 5%, if the loud audio input signal 122 is reduced. As another example, a sliding bias voltage can be generated based on a digital signal processor that executes an algorithm, code, and/or instructions, for example, to provide a control signal that increases or decreases the bias 38 proportional to the level, or other suitable characteristic, of the audio input signal 122. As a further example, the sliding bias control signal may be provided from the compression ratio control output of the K-AMP 120 to a DC level shift and offset adjust 140 that comprises suitable logic, circuitry, interfaces and/or code that may be operable to provide direct current (DC) level shift and offset adjust to the compression ratio control (CRC) output on the K-AMP circuit 120. The DC level shift and offset adjust 140 can be a digital signal processor and/or circuitry, for example, that outputs the sliding bias voltage.

In step 212, a pulse modulated driver input signal is generated by combining the sliding bias voltage 38 and the audio input signal 122. For example, the sliding bias control 130 or DC level shift and offset adjust 140 outputs a generated sliding bias voltage 38 that is added to the audio input signal 122 to control the idle percentage ON time of the modulator. A saw tooth waveform generator provides a saw tooth waveform 150 to one side of a differential comparator 156 and the sliding bias voltage 38 superimposed onto the audio input signal 122 is provided at the other side of the differential comparator 156. Alternatively, the saw tooth waveform 150, audio signal 122, and bias signal 38 may be combined at a single input.

In step 214, the pulse modulated driver input signal is provided to an amplifier 160 to produce a pulse modulated output signal. For example, the output of the comparator 156 is provided to the amplifier 160, such as a single-ended Class D amplifier, for example. Alternatively, the saw tooth waveform 150, audio signal 122, and bias signal 38 may be combined at a single input and provided to the amplifier 160.

In step 216, the pulse modulated output signal is provided to a light emitting diode (LED) 170. For example, an amplifier 160 may comprise suitable logic, circuitry, interfaces and/or code that may be operable to generate a pulse modulated output signal that drives a light emitting diode (LED) 170. In an exemplary embodiment, a voltage doubling circuit is positioned between the amplifier 160 and the LED 170 to provide nearly constant drive voltage to LED 170. The LED 170 may comprise suitable logic, circuitry, interfaces and/or code that may be operable to generate a modulated light beam to transmit the audio signals, for example.

Aspects of the present invention provide a system 100 and method 200 for controlling idling current of a pulse modulated driver. In accordance with various embodiments of the invention, the system 100 comprises an audio input device 110 configured to receive an audio input signal 122. The system 100 comprises sliding bias control circuitry 130 configured to generate a sliding bias control signal based on a level of the audio input signal 122. The system 100 comprises sliding bias generation circuitry 130 configured to generate a sliding bias voltage 38 superimposed onto the audio input signal 122 to generate a pulse modulated driver input signal that is input into an amplifier 160. The sliding bias voltage 38 is based on the sliding bias control signal.

In a representative embodiment, the audio input device 110 comprises at least one of a microphone, a telecoil, and a direct audio input. In certain embodiments, the amplifier 160 is a Class D amplifier. In various embodiments, the system 100 comprises a front end amplifier 120 configured to provide alternating current amplification of the audio input signal 122. In a representative embodiment, the front end amplifier 120 is configured to provide direct current level shift and offset adjust to the audio input signal 122. In certain embodiments, the front end amplifier 120 comprises the sliding bias control circuitry 130. In various embodiments, the sliding bias generation circuitry 130 comprises direct current level shift and offset adjust circuitry 140 configured to provide direct current level shift and offset adjust to generate a sliding bias voltage 38.

In certain embodiments, the sliding bias control circuitry 130 comprises a rectifier 32 configured to generate the sliding bias control signal if the level of the audio input signal 122 exceeds a threshold. In various embodiments, the system 100 comprises a differential comparator 156 configured to receive a saw tooth waveform 150 and the sliding bias voltage 38 superimposed onto the audio input signal 122 to generate the pulse modulated driver input signal. In a representative embodiment, a saw tooth waveform 150, the audio input signal 122, and the sliding bias voltage 38 are combined at a single input and provided to the amplifier 160.

Various embodiments provide a method 200 for controlling idling current of a pulse modulated driver. The method 200 comprises receiving 202 an audio input signal 122 at an audio input device 110. The method 200 comprises generating 208 a sliding bias control signal at a sliding bias control 130 based on a level of the audio input signal 122. The method 200 comprises generating 212 a pulse modulated driver input signal by superimposing a sliding bias voltage 38 onto the audio input signal 122 based on the sliding bias control signal. The method 200 comprises providing 214 the pulse modulated driver input signal to an amplifier 160.

In a representative embodiment, the method 200 comprises providing 204, at a front end amplifier 120, at least one of alternating current amplification of the audio input signal 122, and direct current level shift and offset adjustment of the audio input signal 122. In certain embodiments, the method 200 comprises measuring 206 the level of the audio input signal 122. In various embodiments, the method 200 comprises generating 212 a pulse modulated driver output signal at the amplifier 160. In a representative embodiment, the method 200 comprises providing 216 the pulse modulated driver output signal to a light emitting diode 170.

In certain embodiments, the method 200 comprises generating 216 a modulated light beam to transmit audio signals at the light emitting diode 170. In various embodiments, the amplifier 160 is a Class D amplifier. In a representative embodiment, the generating 212 a pulse modulated driver input signal comprises inputting a saw tooth waveform 150 and the sliding bias voltage 38 superimposed on the audio input signal 122 into a differential comparator 156. In certain embodiments, the generating 212 a pulse modulated driver input signal comprises combining a saw tooth waveform 150, the sliding bias voltage 38, and the audio input signal 122 at a single input. In various embodiments, the sliding bias control 130 is a digital signal processor.

Certain embodiments provide a non-transitory computer-readable medium having stored thereon computer executable instructions wherein the instructions perform steps 202-216 for controlling idling current of a pulse modulated driver. The non-transitory computer-readable medium comprises instructions for receiving 202 an audio input signal 122. The non-transitory computer-readable medium comprises instructions for calculating 206 a level of the audio input signal 122. The non-transitory computer-readable medium comprises instructions for comparing 208 the calculated level with a predetermined threshold. The non-transitory computer-readable medium comprises instructions for shifting 210, 212 an input of an amplifier 160 corresponding with idling current based on the comparison.

In a representative embodiment, the non-transitory computer-readable medium comprises instructions for generating 214 a pulse modulated driver output signal at the amplifier 160. In various embodiments, the non-transitory computer-readable medium comprises instructions for generating 216 a modulated light beam to transmit audio signals based on the pulse modulated driver output signal. In certain embodiments, the amplifier 160 is a Class D amplifier.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for controlling idling current of a pulse modulated driver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, algorithm, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system configured to control idling current of a pulse modulated driver, the system comprising:
    an audio input device configured to receive an audio input signal;
    sliding bias control circuitry configured to generate a sliding bias control signal based on a level of the audio input signal; and
    sliding bias generation circuitry configured to generate a sliding bias voltage superimposed onto the audio input signal to generate a pulse modulated driver input signal that is input into an amplifier, wherein the sliding bias voltage is based on the sliding bias control signal, and wherein the sliding bias voltage adjusts an ON time percentage of the pulse modulated driver input signal.

2. The system of claim 1, wherein the audio input device comprises at least one of:
    a microphone,
    a telecoil, and
    a direct audio input.

3. The system of claim 1, wherein the amplifier is a Class D amplifier.

4. The system of claim 1, comprising a front end amplifier configured to provide alternating current amplification of the audio input signal.

5. The system of claim 4, wherein the front end amplifier is configured to provide direct current level shift and offset adjust to the audio input signal.

6. The system of claim 4, wherein the front end amplifier comprises the sliding bias control circuitry.

7. The system of claim 6, wherein the sliding bias generation circuitry comprises direct current level shift and offset adjust circuitry configured to provide direct current level shift and offset adjust to generate a sliding bias voltage.

8. The system of claim 1, wherein the sliding bias control circuitry comprises a rectifier configured to generate the sliding bias control signal if the level of the audio input signal exceeds a threshold.

9. The system of claim 1, comprising a differential comparator configured to receive a saw tooth waveform and the sliding bias voltage superimposed onto the audio input signal to generate the pulse modulated driver input signal.

10. The system of claim 1 wherein a saw tooth waveform, the audio input signal, and the sliding bias voltage are combined at a single input and provided to the amplifier.

11. A method for controlling idling current of a pulse modulated driver, the method comprising:
    receiving an audio input signal at an audio input device;
    generating a sliding bias control signal at a sliding bias control based on a level of the audio input signal;
    generating a pulse modulated driver input signal by superimposing a sliding bias voltage onto the audio input signal based on the sliding bias control signal, wherein the sliding bias voltage adjusts an ON time percentage of the pulse modulated driver input signal; and
    providing the pulse modulated driver input signal to an amplifier.

12. The method of claim 11, comprising providing, at a front end amplifier, at least one of:
    alternating current amplification of the audio input signal, and
    direct current level shift and offset adjustment of the audio input signal.

13. The method of claim 11, comprising measuring the level of the audio input signal.

14. The method of claim 11, comprising generating a pulse modulated driver output signal at the amplifier.

15. The method of claim 14, comprising providing the pulse modulated driver output signal to a light emitting diode.

16. The method of claim 11, comprising generating a modulated light beam to transmit audio signals at the light emitting diode.

17. The method of claim 11, wherein the amplifier is a Class D amplifier.

18. The method of claim 11, wherein the generating a pulse modulated driver input signal comprises inputting a saw tooth waveform and the sliding bias voltage superimposed on the audio input signal into a differential comparator.

19. The method of claim 11, wherein the generating a pulse modulated driver input signal comprises combining a saw tooth waveform, the sliding bias voltage, and the audio input signal at a single input.

20. The method of claim 11, wherein the sliding bias control is a digital signal processor.

* * * * *